April 28, 1959
S. R. DONER
2,884,292
BRAKE CUP FOR AN HYDRAULIC BRAKE
Filed Oct. 25, 1957
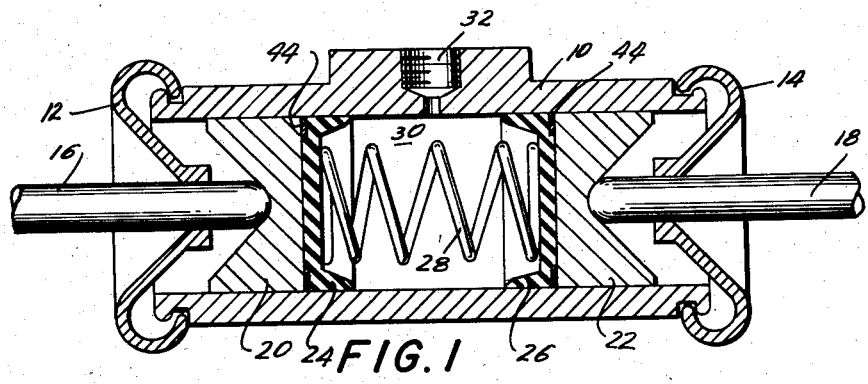
FIG. 1
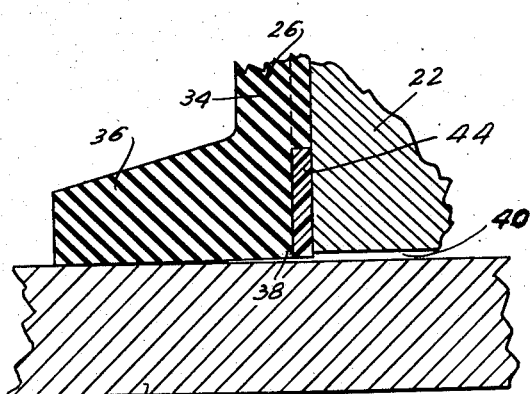
FIG. 3
FIG. 2
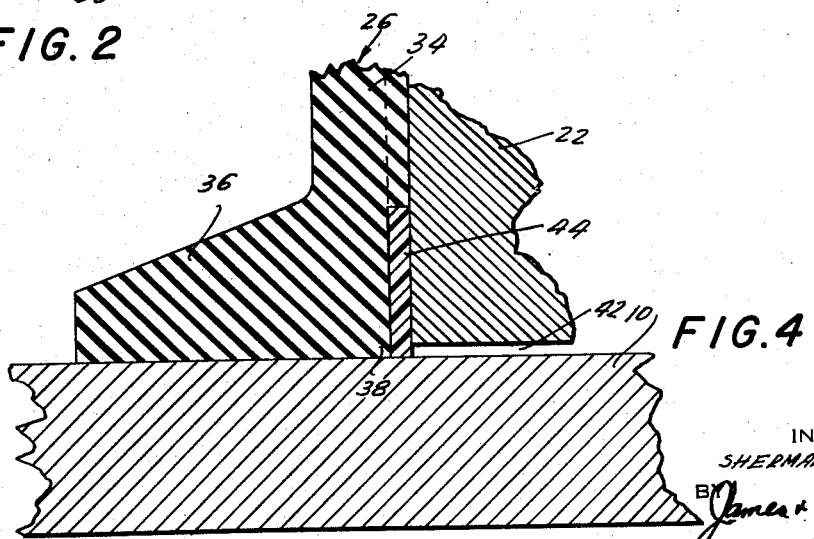
FIG. 4
INVENTOR
SHERMAN R. DONER
BY James + Franklin
ATTORNEY United States Patent Office 2,884,292
Patented Apr. 28, 1959

2,884,292

BRAKE CUP FOR AN HYDRAULIC BRAKE

Sherman R. Doner, Mountain Lakes, N.J., assignor to Raybestos-Manhattan, Inc., Passaic, N.J., a corporation of New Jersey Application October 25, 1957, Serial No. 692,457

2 Claims. (Cl. 309—33)

This invention relates to an improved brake cup for an hydraulic brake system.

In hydraulic brake systems as used in automotive vehicles, the brake shoes are activated by oppositely reciprocable pistons movable in a brake wheel cylinder, each piston being provided with an elastic cup-shaped body which is acted upon by the hydraulic fluid of the system. The cup-shaped body, referred to as the cup, is made of rubber or a rubber-like material and in form comprises a base portion and an encircling and outwardly tapering lip portion, the base portion being adapted for cooperative engagement with the piston, and the lip portion and the heel of the base portion being adapted for cooperative engagement with the cylinder inner wall, in the operation of the brake system.

These wheel cylinder cups are subject to failure or breakdown at combined high pressures and temperatures. This is due to the deterioration of the cup at the so-called heel of the cup (i.e. the rim of the base) due to the extrusion of the rubber material of the cup that takes place at the heel into the clearance space between the piston and the cylinder, with consequent wearing away of the heel of the cup, or "base chewing," as it is commonly called. The underlying reason for this is that rubber becomes quite weak when heated; and the added presence of high pressure when the brake is applied accentuates the extrusion tendency of the rubber at the base heel. This weakness of an all-rubber cup precludes its use in brake systems using pressures of much over 1200 to 1500 p.s.i. Such rubber cups, I have found, will fail in less than 10,000 operating cycles at 1000 p.s.i. pressure at a temperature of 350° F.

I have found that these failures or breakdowns in wheel cylinder cups may be cured or overcome by uniting a ring of a heat-resisting and semi-rigid (i.e. hard yet flexible) plastic material to the heel of the cup base, forming or defining the rim of the base, the material of the ring being such that it has the property of expanding with the base portion material, and at the same time of retaining its semi-rigid character, under increasing temperatures and pressures. The most preferred examples of such material for the heel ring are "Teflon" (polytetrafluoroethylene) and "Kel-F" (polytrifluorochloroethylene), both of which are referred to herein as "fluorocarbon resins."

I have found that such a ring united to the cup at the heel thereof prevents the rubber material of the cup at the heel from being extruded into the clearance between the piston and cylinder under the influence of pressure applied to the lip side of the cup, thereby sealing the clearance against flow thereinto of the cup material, and thereby eliminating "base-chewing" or "pinching-off" of the heel of the cup. Wheel cylinder cups thus improved may be successfully operated at 2000 p.s.i. and are capable of withstanding considerably higher pressures. In contrast to the example given above for all-rubber cups (failure in less than 10,000 cycles at 1000 p.s.i. at 350° F.), cups having an attached Teflon ring forming the rim of the base have withstood tests of 70,000 cycles at 1000 p.s.i. pressure at 350° F. Such materials as "Teflon" and "Kel-F" are ideal for the purpose because they are capable of expansion or stretching at least 5%, they stretch or expand with the rubber under increasing pressures and temperatures and they do not soften appreciably with heat in the range of 350° to 500° F. Also these materials are capable of adhering to the rubber (or synthetic rubber) material of the cups without becoming loose.

The prime object of my present invention is the provision of such improved wheel cylinder brake cups.

To the accomplishment of this object and such other objects as may hereinafter appear, my invention relates to the brake cup for wheel hydraulic brakes as more particularly sought to be defined in the appended claims, taken together with the following specification and the accompanying drawings in which:

Fig. 1 is a view in longitudinal cross-section of a brake wheel cylinder and accompanying parts showing the brake cups of the present invention as applied thereto;

Fig. 2 is a view taken in cross-section and shown on an enlarged scale of a brake cup embodying the present invention;

Fig. 3 is an enlarged view of a part of the structure shown in Fig. 1 illustrating some of the principles of the structure and operation of the brake cup of the present invention; and Fig. 4 is a view similar to that of Fig. 3 and illustrating other principles involved in the structure and operation of the brake cup of the present invention.

Referring first to Fig. 1 of the drawings the hydraulic brake system for automotive vehicles includes a wheel cylinder 10 provided with the end wall caps 12 and 14 through which reciprocate the brake shoe push rods 16 and 18 respectively, the push rods being engaged by the pistons 20 and 22 respectively. The pistons 20 and 22 are provided with the brake cups 24 and 26 held in spaced relation by an expansion spring 28 located in an hydraulic fluid chamber 30, the latter having a fluid inlet port 32. As is well known in the operation of the hydraulic brake system, the brake cups 24 and 26 are acted upon by the hydraulic fluid to actuate the pistons 20 and 22 and the push rods 16 and 18 to in turn operate the brake shoes of the wheel brakes.

The brake cup, as for example the cup 26, comprises a cup-shaped body made of a rubber or a synthetic rubber material and in form comprises, as best depicted in Fig. 2 of the drawings, a base portion 34 and an encircling and outwardly tapering lip portion 36; and as depicted in Figs. 1, 3 and 4, the outside face of the base portion 34 is adapted for cooperative engagement with a piston, such as the piston 22, and the lip portion 36 as well as the so-called heel 38 of the base portion are adapted for cooperative engagement with the inner wall of the cylinder 10, in the operation of the brake system.

Fig. 3 of the drawings depicts the relative positions that the parts of the braking equipment assume in the non-operating position, and Fig. 4 depicts the relative positions that the same parts of the braking equipment assume in operation under increased temperatures and pressures. As shown in Fig. 3, the base 34 of the brake cup is normally made slightly smaller than the bore of the cylinder so that when the cup is at rest or under slight hydraulic pressure the heel 38 of the cup base 34 does not contact the inner wall of the cylinder. It will also be noted that the diameter of the piston 22 is less than the bore of the cylinder 10, there being a clearance 40 therebetween. This clearance normally is from .001" to .003"; and this clearance cannot be controlled because of the difference in temperature between the piston and the cylinder occasioned by the application of the brake, rapid heating of the brake assembly usually resulting in the cylinder getting hot faster than the piston. This fact coupled with the necessity for using commercial machinery tolerances for the cylinders and the pistons results in spaces or clearances which in some instances may increase to .005"; such an increased clearance indicated at 42 is shown in Fig. 4 of the drawings. In the normal operation of these cups (i.e. all rubber cups) the rubber is expanded under the influence of hydraulic pressures and increasing temperatures such that the lip of the cup 36 and the heel 38 of the cup base expand and are forced into close engagement with the wall of the cylinder 10, this being best illustrated in Fig. 4 of the drawings. As a result of both of these phenomena taking place, the rubber material of the cup at the heel 38 extrudes into the clearance 42, the tendency to extrude increasing with increasing temperatures and pressures, with consequent wearing away of the heel of the cup or "base-chewing" as it is commonly called, this resulting in the failures or breakdowns at combined high pressures and temperatures above referred to.

In the brake cup of the present invention there is molded to the heel 38 of the base of the cup a ring 44 of a heat-resistant and semi-rigid (i.e. hard yet flexible) plastic material, forming or defining the rim of the base, the material of the rim being such that it has the property of expanding or stretching with the base portion of material (rubber or synthetic rubber), and at the same time retaining its semi-rigid character under increasing temperatures and pressures. This ring occupies the position and substantially the relative dimensions as best depicted in Figs. 2 to 4 of the drawings. As heretofore pointed out, I have found that the most preferred examples of such material for the heel ring are "Teflon" (polytetrafluoroethylene) and "Kel-F" (polytrifluorochloroethylene), both of which may be referred to as "fluorocarbon resins." To obtain adhesion of the rings such as the Teflon ring to the rubber, the Teflon is sodium etched in a manner well known in the art and then coated with a suitable type of commercially available adhesive, and then cured in a conventional manner to the rubber or synthetic rubber cup. The result is that the rubber cup is provided in effect with a "piston ring" of a semi-rigid slightly elastic material firmly adhered to the back or base of the cup and of the same outside diameter as the back or base of the cup, the said ring providing a "bridge" across the clearance 42 between the piston and the cylinder.

When the brake cup is at rest or under slight hydraulic pressure, the ring 44, as depicted in Fig. 3 of the drawings, is out of contact with the wall of the cylinder 10. In operation, however, under hydraulic pressure and with increasing temperatures the ring 44 stretches or expands integrally and together with the stretching or expansion of the rubber material of the cup with the result that the ring 44 as well as the peripheral area of the lip 36 come in contact with the cylinder wall as is best shown in Fig. 4 of the drawings. The ring 44 being rigidly adhered to the cup is always in contact with the cylinder wall when the cup is under pressure, and being rigid it bridges the clearance 42 and forms a seal against the flow of any rubber material of the cup between the cylinder wall and the piston.

The improved brake cup of my present invention, the manner of making the same, its use in an hydraulic brake assembly and the advantages thereof will in the main be fully apparent from the above detailed description thereof. The heel-ring 44 united to the base 34 of the cup and defining the rim thereof made of the heat-resisting semi-rigid expandable material reinforces the heel of the cup and acts so that under pressure and particularly under increasing temperatures and high pressures, the ring will expand along with the rubber of the cup to seal tightly against the hydraulic cylinder so as to reinforce the rubber and prevent it from oozing into the clearance between the metal piston and the cylinder and being "pinched off" thereby. The fluorocarbon resins referred to are ideal for this purpose because they are sufficiently hard and stiff to effect a proper "bridge," they are expandible with the rubber and in addition they have good lubricating properties so that even though forced into contact with the cylinder wall they do not score the cylinder. While fluorocarbon resins are the preferred materials it will be apparent that other materials having similar properties may be employed. Instead of rubber for the material of the cup, synthetics commonly used for the purpose may be employed such as "Buna N" rubber or neoprene ("Buna S" rubber) or silicone.

It will be further apparent that that other changes may be made without departing from the spirit of the invention defined in the following claims.

I claim:

1. A brake cup for a cylinder and piston comprising an elastic cup-shaped body of rubber material formed to provide a base portion and an encircling lip portion, the base portion having an outside face and a peripheral heel, the lip portion being adapted for cooperative engagement with the inner wall of a cylinder, the outside face of the base portion being adapted for cooperative engagement with a piston, and the peripheral heel of the base portion being adapted for cooperative engagement with the piston and the inner wall of the cylinder, and a ring of a fluorocarbon resin material lodged on and united to the heel of the base portion and forming the rim of the base portion, said ring being expansible under the influence of increasing temperatures and pressures and being expansible radially with the base portion material under such influence into engagement with the cylinder wall, the said ring acting as a heat-resisting, hard yet flexible seal against flow of the material of the cup at the heel between the cylinder wall and the piston.

2. The brake cup of claim 1 in which the ring of fluorocarbon resin material is integrally adhered to the rubber material of the base portion heel, the said ring being expansible and contractable integrally with the expansion and contraction of the base portion heel.

References Cited in the file of this patent

UNITED STATES PATENTS

| | | |
|---|---|---|
| 1,955,157 | Wayne | Apr. 17, 1934 |
| 2,459,562 | Brie | Jan. 18, 1949 |
| 2,656,229 | Stillwagon | Oct. 20, 1953 |
| 2,677,581 | Taylor | May 4, 1954 |